(12) United States Patent
Colak

(10) Patent No.: US 12,444,951 B2
(45) Date of Patent: Oct. 14, 2025

(54) SERIES CONNECTED DC DISTRIBUTION BASED ON SOLID STATE TRANSFORMER

(71) Applicant: SCHNEIDER ELECTRIC IT CORPORATION, Foxboro, MA (US)

(72) Inventor: Ilknur Colak, Grenoble (FR)

(73) Assignee: SCHNEIDER ELECTRIC IT CORPORATION, Foxboro, MA (US)

(*) Notice: Subject to any disclaimer, the term of this patent is extended or adjusted under 35 U.S.C. 154(b) by 24 days.

(21) Appl. No.: 18/378,937

(22) Filed: Oct. 11, 2023

(65) Prior Publication Data

US 2024/0154427 A1 May 9, 2024

Related U.S. Application Data

(60) Provisional application No. 63/382,359, filed on Nov. 4, 2022, provisional application No. 63/382,358, filed on Nov. 4, 2022.

(51) Int. Cl.
  *H02J 3/38* (2006.01)
  *H02J 9/06* (2006.01)
  *H02M 1/00* (2007.01)

(52) U.S. Cl.
  CPC .............. *H02J 3/381* (2013.01); *H02J 9/061* (2013.01); *H02M 1/0077* (2021.05)

(58) Field of Classification Search
  None
  See application file for complete search history.

(56) References Cited

U.S. PATENT DOCUMENTS

| | | | |
|---|---|---|---|
| 7,557,517 B2 | 7/2009 | Jin | |
| 7,855,472 B2 | 12/2010 | Hjort et al. | |
| 8,629,627 B2 | 1/2014 | Cohen et al. | |
| 10,693,312 B2 | 6/2020 | Mondal | |
| 2017/0085183 A1* | 3/2017 | Notsch | H02M 1/44 |
| 2017/0353038 A1* | 12/2017 | Lindtjørn | H02J 3/32 |
| 2023/0318435 A1* | 10/2023 | Yuan | H02J 1/082 |

FOREIGN PATENT DOCUMENTS

| | | |
|---|---|---|
| EP | 3035477 A1 | 6/2016 |
| EP | 3985821 A1 | 4/2022 |

OTHER PUBLICATIONS

Extended European Search Report from corresponding European Application No. 23206788.4 dated Apr. 23, 2024.

* cited by examiner

*Primary Examiner* — Rexford N Barnie
*Assistant Examiner* — Aqeel H Bukhari
(74) *Attorney, Agent, or Firm* — Lando & Anastasi, LLP

(57) ABSTRACT

Examples of the disclosure include a power system comprising a plurality of converters configured to receive DC power, the plurality of converters including a plurality of primary windings and a plurality of secondary windings, wherein each primary winding of the plurality of primary windings is coupled in series, and each secondary winding of the plurality of secondary windings is configured to be coupled to at least one load.

20 Claims, 8 Drawing Sheets

SERIES CONNECTED DC DISTRIBUTION BASED ON SOLID STATE TRANSFORMER

CROSS-REFERENCE TO RELATED APPLICATIONS

This application claims priority under 35 U.S.C. § 119(e) to U.S. Provisional Application Ser. No. 63/382,358, titled "SERIES CONNECTED DC DISTRIBUTION BASED ON SOLID STATE TRANSFORMER," filed on Nov. 4, 2022, and to U.S. Provisional Application Ser. No. 63/382,359, titled "SERIES CONNECTED DC DISTRIBUTION BASED ON SOLID STATE TRANSFORMER," filed on Nov. 4, 2022, each of which is hereby incorporated by reference in its entirety.

BACKGROUND

1. Field of the Disclosure

At least one example in accordance with the present disclosure relates generally to power distribution.

2. Discussion of Related Art

Power devices, such as uninterruptible power supplies (UPSs), may be used to provide power to one or more loads. A utility grid may distribute power to multiple power devices. In some examples, the utility grid may distribute AC power to the power devices. In various examples, the AC power may be converted to DC power prior to being provided to the power devices.

SUMMARY

According to at least one aspect of the present disclosure, a power system is provided comprising a plurality of converters configured to receive DC power, the plurality of converters including a plurality of primary windings and a plurality of secondary windings, wherein each primary winding of the plurality of primary windings is coupled in series, and each secondary winding of the plurality of secondary windings is configured to be coupled to at least one load.

In some examples, the power system includes at least one AC/DC converter. In various examples, the at least one AC/DC converter is configured to provide the DC power to the plurality of converters. In at least one example, the power system includes a plurality of bypass switches, each bypass switch being coupled in parallel with a respective primary winding of the plurality of primary windings. In some examples, the converters are solid-state transformers. In various examples, the converters are primary converters, the power system further including a plurality of secondary converters. In various examples, the power system includes a plurality of legs, each leg including a primary converter and a secondary converter, each leg being configured to be coupled to a respective load. In at least one example, the power system includes a common bus coupled to each secondary winding of the plurality of secondary windings and to each load of the at least one load.

In at least one example, the plurality of legs includes a first leg having a first secondary converter and a second leg having a second secondary converter, the power system further including at least one controller configured to control the first secondary converter to provide, via the second secondary converter, current from the first leg to the second leg. In some examples, the power system includes a first AC/DC converter and a second AC/DC converter, wherein the plurality of converters is coupled in series between the first AC/DC converter and the second AC/DC converter. In various examples, the power system includes at least one controller, wherein the at least one controller is configured to control the first AC/DC converter to draw AC power from a first AC-power source and to control the second AC/DC converter to draw AC power from a second AC-power source. In at least one example, the converters are primary converters, the power system further comprising a plurality of secondary converters, a third AC/DC converter, and a fourth AC/DC converter, the plurality of secondary converters being coupled in series between the third AC/DC converter and the fourth AC/DC converter.

According to at least one aspect of the disclosure, a method of operating a power system including a plurality of converters having a plurality of primary windings and a plurality of secondary windings is provided, the method comprising receiving, by a first primary winding of the plurality of primary windings, a primary DC current, providing, by the first primary winding of the plurality of primary windings, the primary DC current to a second primary winding of the plurality of primary windings, the plurality of primary windings being connected in series, and providing, by each secondary winding of the plurality of secondary windings, a respective induced DC current to one or more respective loads, each induced DC current being induced by the primary DC current.

In some examples, the power system further includes at least one AC/DC converter, the method further comprising receiving, by the at least one AC/DC converter, AC power, and providing, by the at least one AC/DC converter, the primary DC current to the first primary winding, the primary DC current being derived from the AC power. In various examples, the power system further includes a plurality of bypass switches, each bypass switch of the plurality of bypass switches being coupled to a respective primary winding of the plurality of primary windings, the method further including operating a first bypass switch of the plurality of bypass switches such that the primary DC current bypasses a first primary winding of the plurality of primary windings.

In at least one example, the converters are primary converters and wherein the power system includes a plurality of legs having a first leg including a first secondary converter and a second leg including a second secondary converter, the method further including providing, by the first secondary converter via the second secondary converter, current from the first leg to the second leg. In some examples, the power system includes a first AC/DC converter and a second AC/DC converter, the plurality of converters being coupled in series between the first AC/DC converter and the second AC/DC converter, the method further including controlling the first AC/DC converter to draw AC power from a first AC-power source, and controlling the second AC/DC converter to draw AC power from a second AC-power source.

According to at least one aspect of the disclosure, a non-transitory computer-readable medium storing thereon sequences of computer-executable instructions for operating a power system including an AC/DC converter and a plurality of converters having a plurality of primary windings connected in series and a plurality of secondary windings is provided, the sequences of computer-executable instructions including instructions that instruct at least one processor to control the AC/DC converter to provide a primary DC current to a first primary winding of a first converter, control the first converter to provide the primary DC current to a second primary winding of the plurality of primary windings, and control the plurality of converters to provide, by each secondary winding of the plurality of secondary windings, a respective induced DC current to one or more respective loads, each induced DC current being induced by the primary DC current.

In some examples, the power system further includes at least one AC/DC converter, the instructions further instructing the at least one processor to control the at least one AC/DC converter to receive AC power and provide the primary DC current to the first primary winding, the primary DC current being derived from the AC power. In various examples, the converters are primary converters and the power system includes a plurality of legs having a first leg including a first secondary converter and a second leg including a second secondary converter, the instructions further instructing the at least one processor to control the first secondary converter to provide, via the second secondary converter, current from the first leg to the second leg. In at least one example, the power system includes a first AC/DC converter and a second AC/DC converter, the plurality of converters being coupled in series between the first AC/DC converter and the second AC/DC converter, the instructions further instructing the at least one processor to control the first AC/DC converter to draw AC power from a first AC-power source, and control the second AC/DC converter to draw AC power from a second AC-power source.

At least one example in accordance with the present disclosure relates generally to power distribution. Power devices, such as uninterruptible power supplies (UPS s), may be used to provide power to one or more loads. A utility grid may distribute power to multiple power devices. In some examples, the utility grid may distribute AC power to the power devices. In various examples, the AC power may be converted to DC power prior to being provided to the power devices.

According to at least one aspect of the present disclosure, a power system is provided comprising a plurality of converters configured to receive DC power, the plurality of converters including a plurality of primary windings and a plurality of secondary windings, wherein each primary winding of the plurality of primary windings is coupled in series, and each secondary winding of the plurality of secondary windings is configured to be coupled to at least one load.

In some examples, the power system includes at least one AC/DC converter. In various examples, the at least one AC/DC converter is configured to provide the DC power to the plurality of converters. In at least one example, the power system includes a plurality of bypass switches, each bypass switch being coupled in parallel with a respective primary winding of the plurality of primary windings. In some examples, the converters are solid-state transformers. In various examples, the converters are primary converters, the power system further comprising a plurality of secondary converters. In at least one example, the power system includes a plurality of legs, each leg including a primary converter and a secondary converter, each leg being configured to be coupled to a respective load.

In some examples, the plurality of legs includes a first leg having a first primary converter and a first secondary converter coupled to one or more first loads, the power system further including at least one controller configured to control the first primary converter as a voltage-source converter. In various examples, the at least one controller is configured to control the voltage-source converter to provide a constant voltage to the one or more first loads. In at least one example, the plurality of legs includes a first leg having a first primary converter and a first secondary converter coupled to one or more first loads, the power system further including at least one controller configured to control the first secondary converter as a current-source converter.

In some examples, the at least one controller is configured to control the current-source converter to provide a constant current to the one or more first loads. In various examples, the power system includes an AC/DC converter coupled to the plurality of primary converters and to the plurality of secondary converters. In at least one example, the power system includes at least one controller, wherein the at least one controller is configured to control the AC/DC converter to draw AC power from at least one of a first AC-power source or a second AC-power source and to provide a primary DC current to the plurality of primary converters to induce a respective load current in a respective secondary winding of each primary converter. In some examples, the at least one controller is further configured to control a respective secondary converter to draw, responsive to determining that the respective load current is below a load current requirement, supplemental current from the at least one of the first AC-power source or the second AC-power source to provide to a respective load, and return, responsive to determining that the respective load current is above a load current requirement, at least a portion of the respective load current to the at least one of the first AC-power source or the second AC-power source.

According to at least one example, a method of operating a power system including a plurality of converters having a plurality of primary windings and a plurality of secondary windings is provided, the method including receiving, by a first primary winding of the plurality of primary windings, a primary DC current, providing, by the first primary winding of the plurality of primary windings, the primary DC current to a second primary winding of the plurality of primary windings, the plurality of primary windings being connected in series, and providing, by each secondary winding of the plurality of secondary windings, a respective induced DC current to one or more respective loads, each induced DC current being induced by the primary DC current.

In some examples, the converters are primary converters and the power system further includes a plurality of legs, each leg including a primary converter and a secondary converter and being configured to be coupled to a respective load, the method further including operating each primary converter as a voltage-source converter. In various examples, the method includes operating each voltage-source converter to provide a constant voltage to one or more respective loads. In at least one example, the converters are primary converters and the power system further comprises a plurality of legs, each leg including a primary converter and a secondary converter and being configured to be coupled to a respective load, the method further including operating each secondary converter as a current-source converter. In some examples, the method includes controlling each current-source converter to provide a constant current to one or more respective loads.

According to at least one example, a non-transitory computer-readable medium storing thereon sequences of computer-executable instructions for operating a power system including an AC/DC converter and a plurality of converters having a plurality of primary windings connected in series and a plurality of secondary windings is provided, the sequences of computer-executable instructions including instructions that instruct at least one processor to control the AC/DC converter to provide a primary DC current to a first primary winding of a first converter, control the first converter to provide the primary DC current to a second primary winding of the plurality of primary windings, and control the plurality of converters to provide, by each secondary winding of the plurality of secondary windings, a respective induced DC current to one or more respective loads, each induced DC current being induced by the primary DC current.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
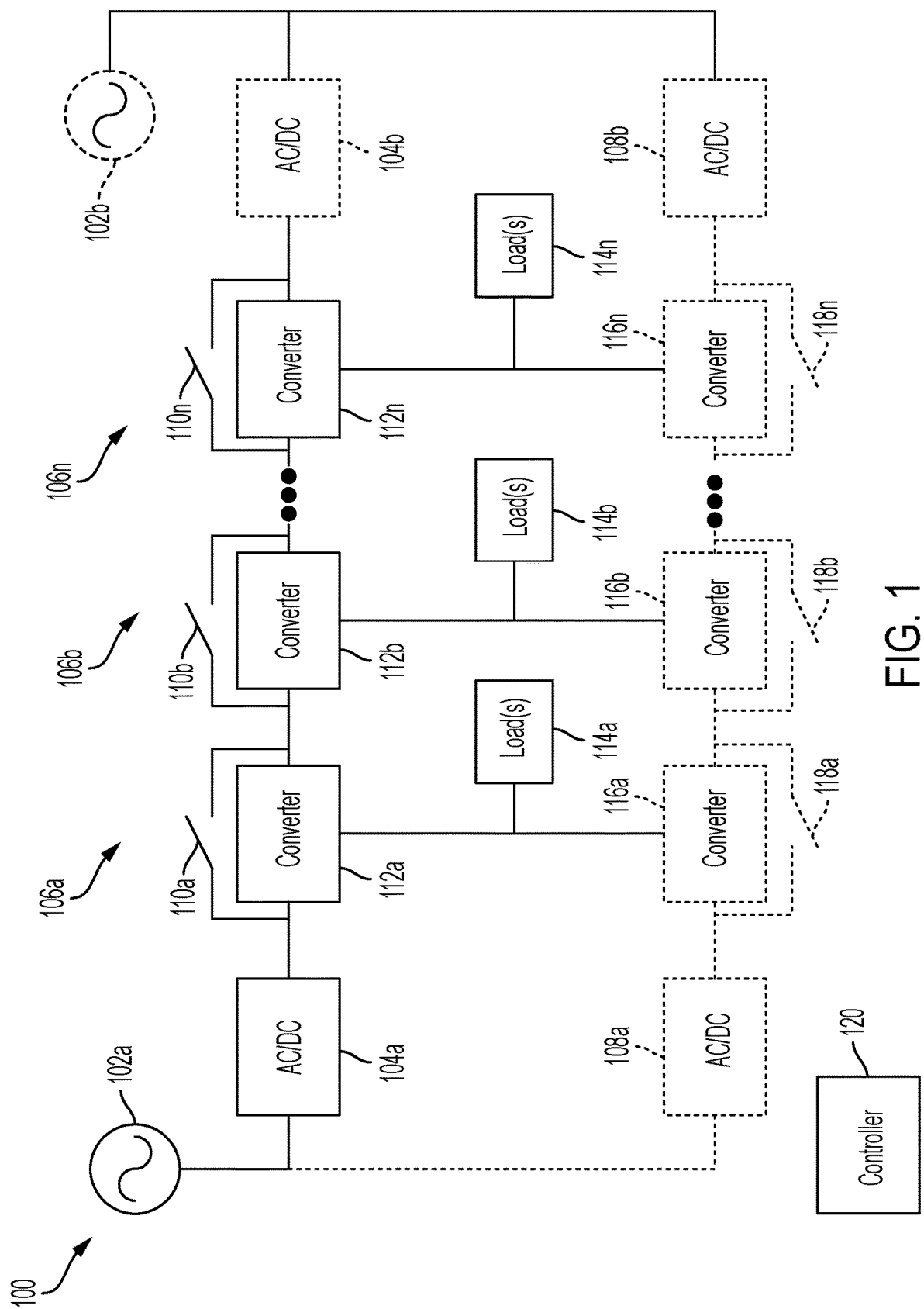
FIG. 1 illustrates a block diagram of a power system according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As discussed above, utility grids may be used to distribute power to one or more loads. For example, a utility grid may supply power to a data center having multiple power-consuming devices, such as power-distribution units, information-technology equipment, servers, temperature-control equipment, and so forth. In some examples, the power-consuming devices may consume AC power from the utility grid. In other examples, an AC/DC converter may be used to convert AC grid power to DC power and provide the DC power to the power-consuming devices (hereinafter, "loads"). In still other examples, the utility grid may provide DC power to the loads, and the loads may consume DC power from the utility grid.

In examples in which AC power is provided to the loads, the AC power may be distributed to an arbitrary number of legs of parallel-connected loads. Various equipment and/or devices may be implemented to facilitate AC power distribution in a power system, such as power-factor-correction (PFC) circuits, AC-harmonic-filter circuits, and so forth. Because the legs are all subjected to the same, full AC voltage, each leg may be rated to withstand the full AC voltage.

In examples in which DC power is provided to the loads, the DC power may be distributed to an arbitrary number of series-connected loads. DC loads may not require PFC circuits nor harmonic-filter circuits and, because the legs are connected in series, each leg may be rated to withstand only a fraction of the full source voltage (for example, inversely proportional to the number of legs). Other aspects of DC distribution include simpler voltage control as the magnitude and polarity of the DC voltage may remain static; reduced grounding and shielding requirements; lower corona losses; the elimination of inductance- and capacitance-related inefficiencies; reduced insulation requirements due to the absence of skin effects; the possibility for energy-storage resources such as batteries and capacitors (and/or supercapacitors); a reduced number and length of power-conduction cables; and, amongst other aspects, reduced voltage drop due to the absence of inductance in the power-transmission lines.

Accordingly, in some examples a power-distribution system may benefit from DC-power distribution rather than AC-power distribution. Examples of the disclosure provide a DC-power-distribution system configured to distribute power to an arbitrary number of series-connected load legs. Each load leg includes a first converter (for example, a solid-state transformer), one or more loads, and, optionally, a second converter (for example, a solid-state transformer). Each of the first converters may include a respective first transformer, and each of the second converters may include a respective second transformer. In various examples, the load legs are connected in series inasmuch as a primary winding of each respective first transformer is connected in series. Because the series-connected primary windings are connected in series, each leg may be provided with approximately the same current. The optional second converter may, however, enable a current to each load leg to be modified. In one example, the optional second converter may enable current sharing between two or more load legs such that the current in one leg may be different than the current in another leg. In another example, the first converter may be operated as a voltage-source converter, and the optional second converter may be operated as a current-source converter that draws additional or less current from the utility grid. Examples of the disclosure therefore provide a DC-power distribution system having multiple series-connected load legs in which an amount of current to each load leg may be independently controlled.

FIG. 1 illustrates a block diagram of a power system 100 according to an example. The power system 100 includes a first AC-power source 102a, a first primary DC/AC converter 104a, and one or more load legs 106 ("legs 106") arbitrarily illustrated as including a first load leg 106a, a second load leg 106b, and a third load leg 106n. The legs 106 may include additional or fewer legs in other examples. In some examples, the power system 100 may optionally include one or more additional optional components including a second AC-power source 102b, a second primary DC/AC converter 104b, a first secondary DC/AC converter 108a, and/or a second secondary DC/AC converter 108b.

The first load leg 106a includes a first primary bypass switch 110a and a first primary converter 112a, and is configured to be coupled to one or more first loads 114a ("first loads 114a"). In some examples, the first load leg 106a may optionally include a first secondary converter 116a and a first secondary bypass switch 118a. The second load leg 106b includes a second primary bypass switch 110b and a second primary converter 112b, and is configured to be coupled to one or more second loads 114b ("second loads 114b"). In some examples, the second load leg 106b may optionally include a second secondary converter 116b and a second secondary bypass switch 118b. The third load leg 106n includes a third primary bypass switch 110n and a third primary converter 112n, and is configured to be coupled to one or more third loads 114n ("third loads 114n"). In some examples, the third load leg 106n may optionally be coupled to a third secondary converter 116n and a third secondary bypass switch 118n. The power system 100 further includes at least one controller 120 ("controller 120").

The first AC-power source 102a is coupled to the first primary AC/DC converter 104a and to the first secondary AC/DC converter 108a. The second AC-power source 102b is coupled to the second primary AC/DC converter 104b and to the second secondary AC/DC converter 108b. The first primary AC/DC converter 104a is coupled to the first AC-power source 102a at a first connection, and is coupled to the first primary bypass switch 110a and the first primary converter 112a at a second connection. As discussed in greater detail below, in some examples, the first primary AC/DC converter 104a may also be coupled to the first secondary converter 116a and to the first secondary bypass switch 118a at the second connection. The second primary AC/DC converter 104b is coupled to the second AC-power source 102b at a first connection, and is coupled to the third primary bypass switch 110c and to the third primary converter 112n at a second connection. As discussed in greater detail below, in some examples, the second primary AC/DC converter 104b may also be coupled to the third secondary converter 116n and to the third secondary bypass switch 118n at the second connection.

The first secondary AC/DC converter 108a is coupled to the first AC-power source 102a at a first connection, and is coupled to the first secondary converter 116a and the first secondary bypass switch 118a. The second secondary AC/DC converter 108b is coupled to the second AC-power source 102b at a first connection, and is coupled to the third secondary converter 116n and the third secondary bypass switch 118n.

The first primary bypass switch 110a is coupled to the first primary AC/DC converter 104a at a first connection, is coupled to the second primary bypass switch 110b and the second converter 112b at a second connection, and is coupled in parallel with the first converter 112a. The second primary bypass switch 110b is coupled to the first primary bypass switch 110a and to the first primary converter 112a at a first connection, is coupled to the third primary bypass switch 110n and the third primary converter 112n at a second connection, and is coupled in parallel with the second primary converter 112b. The third primary bypass switch 110n is coupled to the second primary bypass switch 110b and the second primary converter 112b at a first connection, is coupled to the second primary AC/DC converter 104b at a second connection, and is coupled in parallel with the third primary converter 112n.

The first primary converter 112a is coupled to the first primary AC/DC converter 104a at a first connection, is coupled to the second primary converter 112b at a second connection, is coupled to the first loads 114a and the first secondary converter 116a at a third connection, and is coupled in parallel with the first primary bypass switch 110a. The second primary converter 112b is coupled to the first primary bypass switch 110a and the first primary converter 112a at a first connection, is coupled to the third primary bypass switch 110n and the third primary converter 112n at a second connection, is coupled to the second loads 114b and the second secondary converter 116b at a third connection, and is coupled in parallel with the second primary bypass switch 110b. The third primary converter 112n is coupled to the second primary bypass switch 110b and the second primary converter 112b at a first connection, is coupled to the second primary AC/DC converter 104b at a second connection, is coupled to the third loads 114n and the third secondary converter 116n at a third connection, and is coupled in parallel with the third primary bypass switch 110n.

In various examples, each of the primary converters 112 is or includes a solid-state transformer having a primary winding connected in parallel with a respective one of the primary bypass switches 110, and a secondary winding connected to a respective one of the loads 114. In some examples, each of the primary converters 112 includes one or more switching devices connected to the primary winding and/or the secondary winding. In various examples, each of the primary converters 112 may be bidirectional; accordingly, windings may be referred to as primary and secondary for convenience of explanation rather than limitation.

The first loads 114a are coupled to the first primary converter 112a and to the first secondary converter 116a. The second loads 114b are coupled to the second primary converter 112b and to the second secondary converter 116b. The third loads 114n are coupled to the third primary converter 112n and to the third secondary converter 116n.

The first secondary converter 116a is coupled to the first secondary AC/DC converter 108a at a first connection, is coupled to the second secondary converter 116b and the second secondary bypass switch 118*b* at a second connection, is coupled to the first primary converter 112*a* and the first loads 114*a* at a third connection, and is coupled in parallel with the first primary bypass switch 118*a*. The second secondary converter 116*b* is coupled to the first secondary converter 116*a* and the first primary bypass switch 118*a* at a first connection, is coupled to the third secondary converter 116*n* and the third secondary bypass switch 118*n* at a second connection, is coupled to the second primary converter 112*b* and the second loads 114*b* at a third connection, and is coupled in parallel with the second secondary bypass switch 118*b*. The third secondary converter 116*n* is coupled to the second secondary converter 116*b* and the second secondary bypass switch 118*b* at a first connection, is coupled to the second secondary AC/DC converter 108*b* at a second connection, is coupled to the third primary converter 112*n* and the third loads 114*n* at a third connection, and is coupled in parallel with the third secondary bypass switch 118*n*.

In various examples, each of the secondary converters 116 is or includes a solid-state transformer having a primary winding connected in parallel with a respective one of the secondary bypass switches 118, and a secondary winding connected to a respective one of the loads 114. In some examples, each of the secondary converters 116 includes one or more switching devices connected to the primary winding and/or the secondary winding. In various examples, each of the secondary converters 116 may be bidirectional; accordingly, windings may be referred to as primary and secondary for convenience of explanation rather than limitation.

The first secondary bypass switch 118*a* is coupled to the first secondary AC/DC converter 108*a* at a first connection, is coupled to the second secondary converter 116*b* and the second secondary bypass switch 118*b* at a second connection, and is coupled in parallel with the first secondary converter 116*a*. The second secondary bypass switch 118*b* is coupled to the first secondary converter 116*a* and the first secondary bypass switch 118*a* at a first connection, is coupled to the third secondary converter 116*n* and the third secondary bypass switch 118*n* at a second connection, and is coupled in parallel with the second secondary converter 116*b*. The third secondary bypass switch 118*n* is coupled to the second secondary converter 116*b* and the second secondary bypass switch 118*b* at a first connection, is coupled to the second secondary AC/DC converter 108*b* at a second connection, and is coupled in parallel with the third secondary converter 116*n*.

The controller 120 may be communicatively coupled to one or more of the components 104-118. For illustrative clarity, communicative connections are not illustrated. As discussed above, one or more components of the power system 100 may be optional components. Accordingly, in examples in which an optional component is omitted, the connections discussed above may be changed as though the omitted component were replaced with a short circuit, an open circuit, another component or connection, and so forth.

In some examples, the optional second AC-power source 102*b*, the optional second primary AC/DC converter 104*b*, and the optional second secondary AC/DC converter 108*b* may be omitted. The second AC-power source 102*b* may provide a redundant supply of power to account for, for example, failure of the first AC-power source 102*a*. The AC-power sources 102*a*, 102*b* may each be utility grids; if one of the utility grids is unavailable, the other utility grid may be used as a redundant backup power supply. Accordingly, while the optional second AC-power source 102*b*, the optional second primary AC/DC converter 104*b*, and the optional second secondary AC/DC converter 108*b* may be included where redundancy is desired, they may be omitted in some examples.

In some examples, the optional first secondary AC/DC converter 108*a*, the optional secondary converters 116, the optional bypass switches 118, and the optional second secondary AC/DC converter 108*b* may be omitted. The secondary converters 116 may enable the current provided to the legs 106 to differ from one another. In one example, the secondary converters 116 are configured to enable current sharing between the legs 106. In another example, the secondary converters 116 are operated as current-source converters to draw or return supplemental current from or to the first AC-power source 102*a* and/or the second AC-power source 102*b*. In still other examples, the secondary converters 116 (and, by extension, the first secondary AC/DC converter 108*a*, the secondary bypass switches 118, and the second secondary AC/DC converter 108*b*) may be omitted if, for example, the current drawn by each of the legs 106 is approximately equal within a threshold range of deviation (for example, 5-10%).

Figure 2:
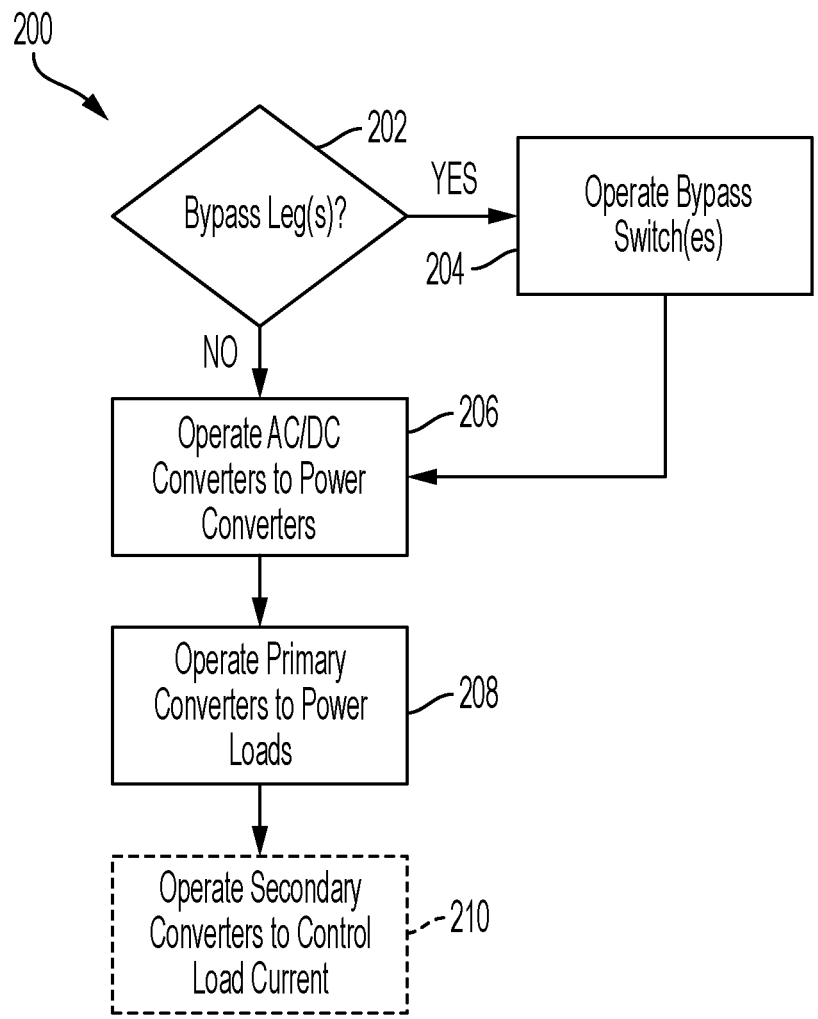
FIG. 2 illustrates a process of operating a power system according to an example.

FIG. 2 illustrates a process 200 of operating the power system 100 according to an example. Examples are provided in which the controller 120 executes the process 200. In some examples, the process 200 may be executed where the second AC-power source 102*b*, the second primary AC/DC converter 104*b*, and the second primary AC/DC converter 104*b* are omitted or are included. Similarly, in various examples, the process 200 may be executed where the first secondary AC/DC converter 108*a*, the second secondary AC/DC converter 108*b*, the secondary converters 116, and the secondary bypass switches 118 are omitted or are included. For purposes of example, some examples of the process 200 are provided in which the various components are included and some examples of the process 200 are provided in which the various components are omitted.

At act 202, the controller 120 determines whether any of the legs 106 should be bypassed. For example, if one of the legs 106 is undergoing maintenance, the controller 120 may determine that the leg should be bypassed so that the leg can be safely worked on. In another example, if one of the legs 106 is experiencing a component malfunction, the controller 120 may determine that the leg should be bypassed until the malfunction has been addressed. In another example, if one of the loads 114 connected to one of the legs 106 is not drawing power, the controller 120 may determine that the leg should be bypassed until the respective loads are again drawing power. In other examples, the controller 120 may determine that one or more of the legs 106 should be bypassed in response to one or more other conditions. If the controller 120 determines that one or more of the legs 106 should be bypassed (202 YES), then the process 200 continues to act 204. Otherwise, if the controller 120 determines that none of the legs 106 should be bypassed (202 NO), then the process 200 continues to act 206.

At act 204, the controller 120 operates one or more of the bypass switches 110, 118 to bypass one or more of the legs 106 that are to be bypassed. For example, if the controller 120 determined at act 202 that the first leg 106*a* should be bypassed, then the controller 120 may control the first primary bypass switch 110*a* to be in a closed and conducting position. In examples in which the first secondary converter 116*a* is included, the controller 120 may also control the first secondary bypass switch 118*a* to be in a closed and conducting position. Closing the bypass switches 110*a*, 118*a* enables current to bypass the converters 112*a*, 116*a*, respectively, such that current is not delivered to the first leg 106*a* but may still be provided to the second leg 106b and to the third leg 106n. The remaining bypass switches 110b, 110n, 118b, 118n may remain open and non-conducting. In various examples, the controller 120 may determine that none of the legs 106 are to be bypassed and may therefore not control any of the bypass switches 110, 118 to be closed and conducting.

At act 206, the controller 120 operates one or more of the AC/DC converters 104, 108 to provide power to at least one of the converters 112, 116. In various examples, the controller 120 may at least control the first primary AC/DC converter 104a to draw AC power from the first AC-power source 102a, convert the AC power to DC power, and provide the DC power to the primary converters 112 regardless of which optional components are included or omitted. Current from the first AC-power source 102a may be provided in series to each of the series-connected primary windings of the primary converters 112 that are not to be bypassed. In examples in which the second AC-power source 102b is included, the controller 120 may also control the second primary AC/DC converter 104b to draw AC power from the second AC-power source 102b, convert the AC power to DC power, and provide the DC power to the primary converters 112. In examples in which the secondary converters 116 are included, the controller 120 may also control the first secondary AC/DC converter 108a and/or the second secondary AC/DC converter 108n to return current to the AC-power sources 102a, 102b, respectively, or to share the current amongst other ones of the legs 106, as discussed in greater detail below.

At act 208, the controller 120 operates one or more converters to provide power to one or more respective loads. For example, the controller 120 may operate one or more switching devices included in, or coupled to, the primary converters 112 to draw DC power from one or more of the AC/DC converters 104a, 104b, 108a, 108b, convert the DC power to AC power, provide the AC power to a primary winding to induce a current in a secondary winding, convert the induced current to DC current, and provide the current to the loads 114. In some examples, the controller 120 may control the primary converters 112 to draw power from one or both of the AC-power sources 102a, 102b. For example, the controller 120 may control one or more of the legs 106 to draw power only from the first AC-power source 102a, and may control a remaining one or more of the legs 106 to draw power only from the second AC-power source 102b. In another example, the controller 120 may control all of the legs 106 to draw power from only one of the AC-power sources 102a, 102b. In examples in which multiple of the primary converters 112 receive power from one AC source, the AC source may provide current to the respective primary windings of the primary converters 112 in series such that a current to each of the primary windings is substantially equal.

At optional act 210, the controller 120 may optionally control the secondary converters 116 to control a current to respective ones of the legs 106. Optional act 210 may not be executed where, for example, the secondary converters 116 are omitted. If the secondary converters 116 are included and act 210 is executed, the controller 120 may control the secondary converters 116 to account for differences in current requirements between the legs 106 by balancing the current between the legs 106. As discussed above, a current may be provided in series to multiple primary windings of the primary converters 112. Accordingly, the current provided to the series-connected primary windings may be approximately equal, which may be acceptable if the current requirements of the loads 114 connected to the series-connected primary windings are roughly equal, that is, within a threshold deviation of one another. However, if the current requirements of the loads 114 exceeds the threshold deviation, the controller 120 may control the secondary converters 116 to balance the current between the legs 106.

A threshold deviation may be expressed as a percentage difference between a series-connected leg having a highest current requirement and a series-connected leg having a lowest current requirement. For example, a threshold deviation may be a percentage such as 5%, 7.5%, 10%, or another value. If the difference in current requirements for the series-connected legs is less than the threshold deviation, the controller 120 may not control the secondary converters 116 to balance the current. Conversely, if the difference exceeds the threshold deviation, the controller 120 may control the secondary converters 116 to balance the current. As discussed in greater detail below, in one example, balancing the current includes sharing current between two or more of the legs 106. In another example, balancing the current includes operating the secondary converters 116 as current-source converters to inject supplemental current to respective ones of the legs 106 that may require additional current. In still other examples, other schemes may be implemented to vary an amount of current between the legs 106.

Figure 3:
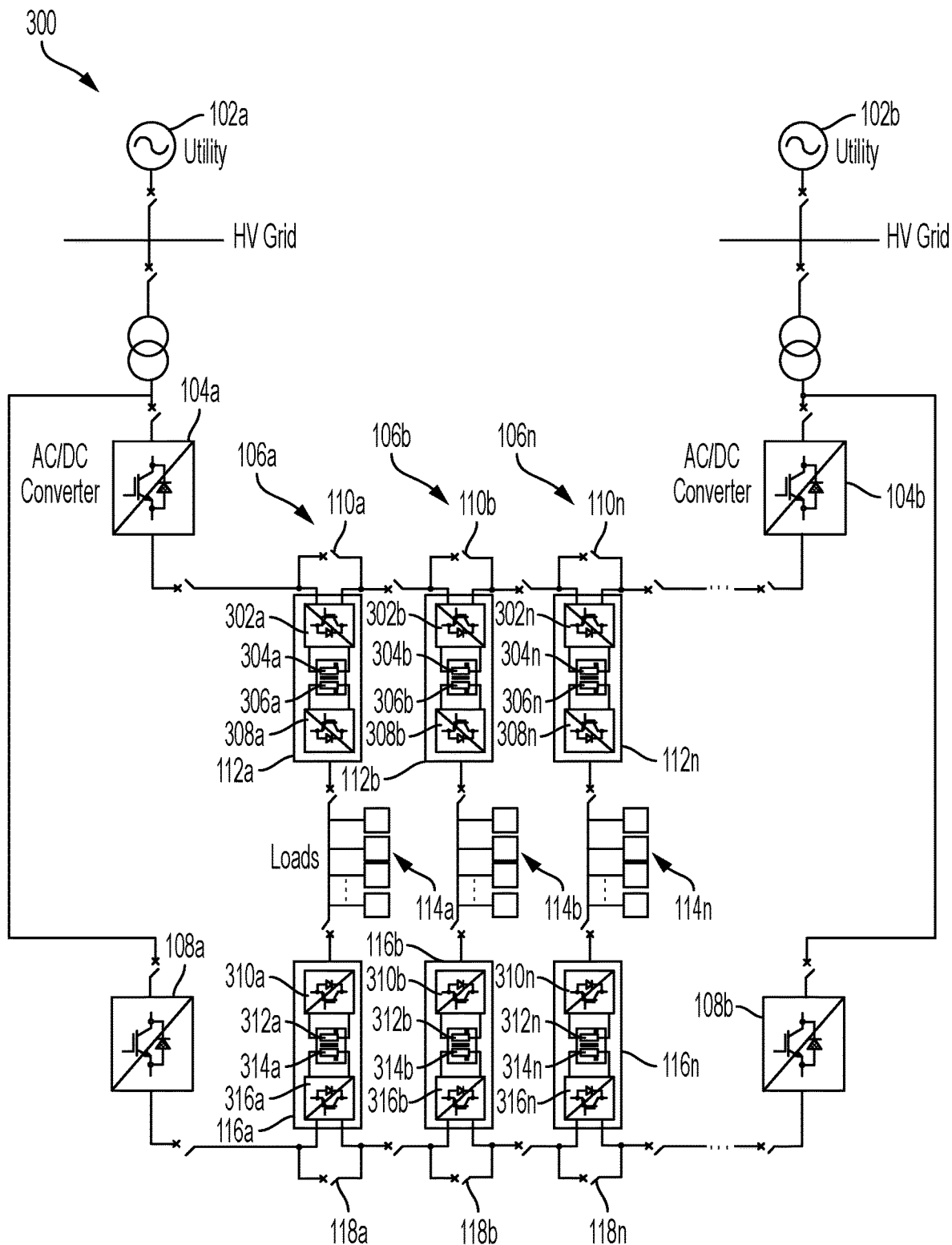
FIG. 3 illustrates a schematic diagram of a power system according to an example.

FIG. 3 illustrates a schematic diagram of a power system 300 according to an example. The power system 300 may illustrate one implementation of the power system 100, and like components are labeled accordingly. For example, the power system 300 includes the AC-power sources 102a, 102b, the primary AC/DC converters 104a, 104b, the legs 106a, 106b, 106n, the secondary AC/DC converters 108a, 108b, the primary bypass switches 110a, 110b, 110n, the primary converters 112a, 112b, 112n, the loads 114a, 114b, 114n, the secondary converters 116a, 116b, 116n, the secondary bypass switches 118a, 118b, 118n, and the controller 120.

Each of the primary converters 112a, 112b, 112n, includes a primary-side set of one or more switching devices 302a, 302b, 302n, respectively, a primary winding 304a, 304b, 304n, respectively, a secondary winding 306a, 306b, 306n, and a secondary-side set of one or more switching devices 308a, 308b, 308n, respectively. Each of the secondary converters 116a, 116b, 116n, includes a primary-side set of one or more switching devices 310a, 310b, 310n, respectively, a primary winding 312a, 312b, 312n, respectively, a secondary winding 314a, 314b, 314n, respectively, and a secondary-side set of one or more switching device 316, 316b, 316n. Accordingly, each of the primary converters 112 and secondary converters 116 may be or include a respective solid-state transformer having a primary winding and a secondary winding. In various examples, the primary converters 112a, 112b, 112n and secondary converters 116a, 116b, 116n may be bidirectional; accordingly, the terms "primary winding" and "secondary winding" may be used for convenience rather than to imply limitation.

Each set of switching devices of the primary-side set of one or more switching devices 302a, 302b, 302n is coupled in parallel with a respective one of the primary bypass switches 110a, 110b, 110n, and is coupled to a respective one of the primary windings 304a, 304b, 304n.

As discussed above, the controller 120 may operate the primary-side set of one or more switching devices 302a, 302b, 302n to convert DC current to AC current to provide to a respective one of the primary windings 304a, 304b, 304n. The primary windings 304a, 304b, 304n are coupled in series with one another via the respective primary-side set of one or more switching devices 302a, 302b, 302n. The primary windings 304a, 304b, 304n are inductively coupled to the secondary windings 306a, 306b, 306n, respectively. As discussed above, the controller 120 may operate the secondary-side set of one or more switching devices 308a, 308b, 308n to convert induced AC current from the secondary windings 306a, 306b, 306n to DC current to provide to the loads 114a, 114b, 114n.

Each set of switching devices of the primary-side set of one or more switching devices 310a, 310b, 310n is coupled in parallel with a respective one of the secondary bypass switches 118a, 118b, 118n, and is coupled to a respective one of the primary windings 312a, 312b, 312n. As discussed above, the controller 120 may operate the primary-side set of one or more switching devices 310a, 310b, 310n to convert DC current to AC current to provide to a respective one of the primary windings 312a, 312b, 312n. The primary windings 312a, 312b, 312n are inductively coupled to the secondary windings 314a, 314b, 314n, respectively. As discussed above, the controller 120 may operate the secondary-side set of one or more switching devices 316a, 316b, 316n to convert induced AC current from the secondary windings 314a, 314b, 314n to DC current to provide to, for example, one or more of the other legs 106 to support current sharing. The secondary windings 314a, 314b, 314n are coupled in series with one another via the respective secondary-side set of one or more switching devices 316a, 316b, 316n.

In various examples, the secondary converters 116 may be bidirectional. For example, the secondary converters 116 may draw current from one or both of the AC-power sources 102a, 102b to inject supplemental current to a respective one of the legs 106. Accordingly, while certain windings of the secondary converters 116 are identified as primary or secondary windings, in other examples the windings identified as primary windings may behave as secondary windings and vice versa.

Figure 4:
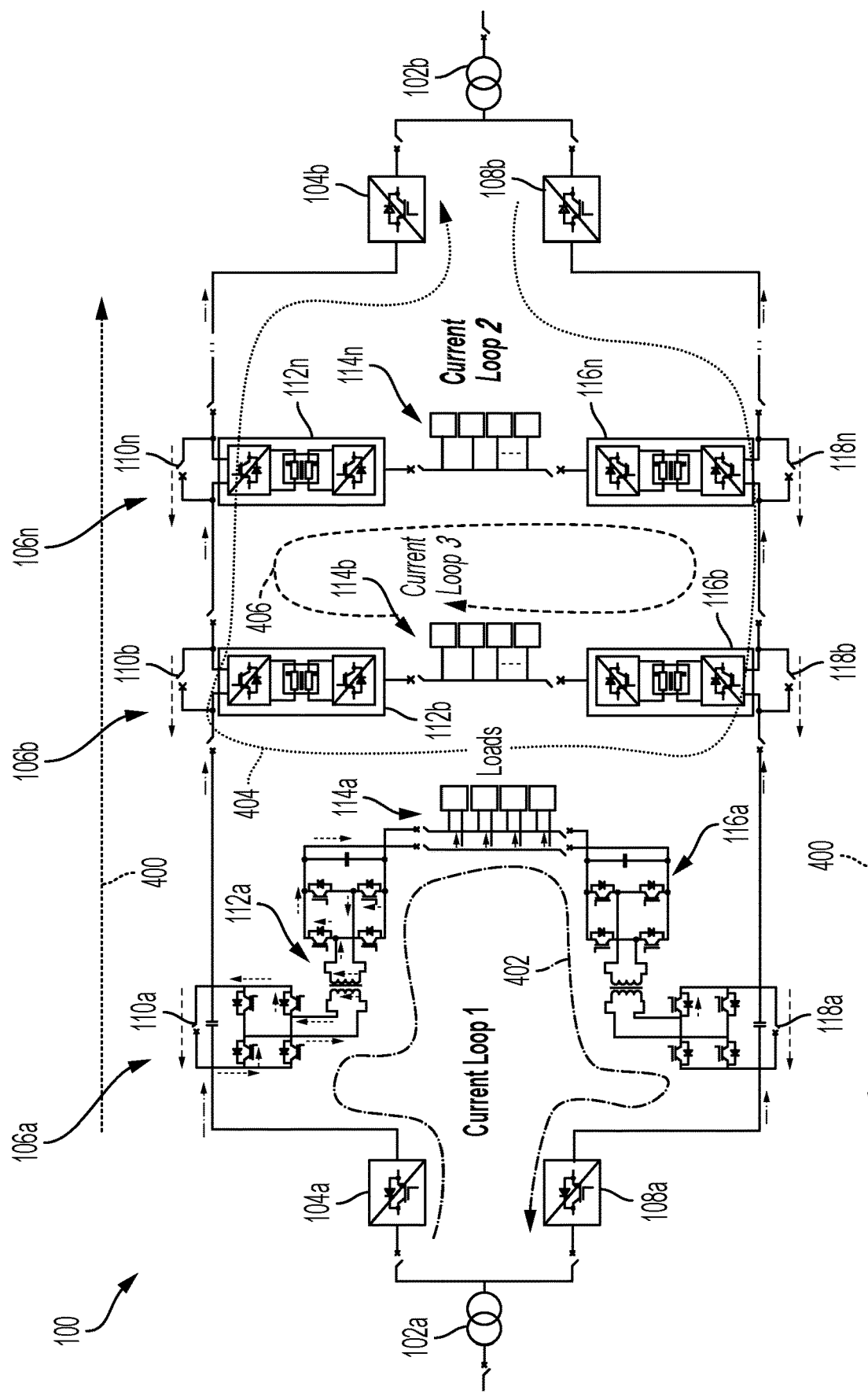
FIG. 4 illustrates a schematic diagram of a power system according to another example.

As discussed above, the secondary converters 116 may be controlled to support current sharing between the legs 106. FIG. 4 illustrates a schematic diagram of the power system 100 according to an example in which current sharing is implemented. For clarity of illustration, some reference numbers have been omitted. In the illustrated example of FIG. 4, the legs 106 draw a total current 400 from one or both of the AC-power sources 102. The total current 400 is provided in series to the primary windings 304a, 304b, 304n, thereby inducing a current in the secondary windings 306a, 306b, 306n which is provided to the loads 114a, 114b, 114n. However, current requirements between the legs 106a, 106b, 106n may differ, and the total current 400 may therefore not provide an appropriate amount of current to one or more of the legs 106a, 106b, 106n. For example, although a first current 402 provided to the first leg 106a may provide an appropriate amount of current to the first leg 106a, the second leg 106b may not receive enough current from the total current 400 and the third leg 106n may receive too much current from the total current 400.

Accordingly, the controller 120 may control the secondary converters 116b, 116n to share current between the legs 106b, 106n. For example, the controller 120 may control the third secondary converter 116n to divert a second current 404 away from the third loads 114n and instead share the current with the second secondary converter 116b. The controller 120 may control the second secondary converter 116b to draw the shared current from the third secondary converter 116n and provide the shared current to the second loads 114b, thereby supplementing the current induced by the total current 400 to provide a third current 406 to the second loads 114b. Accordingly, the secondary converters 116b, 116n may be operated to support current sharing where a current provided in series is not appropriate to support the loads 114a, 114b, 114n.

Figure 5:
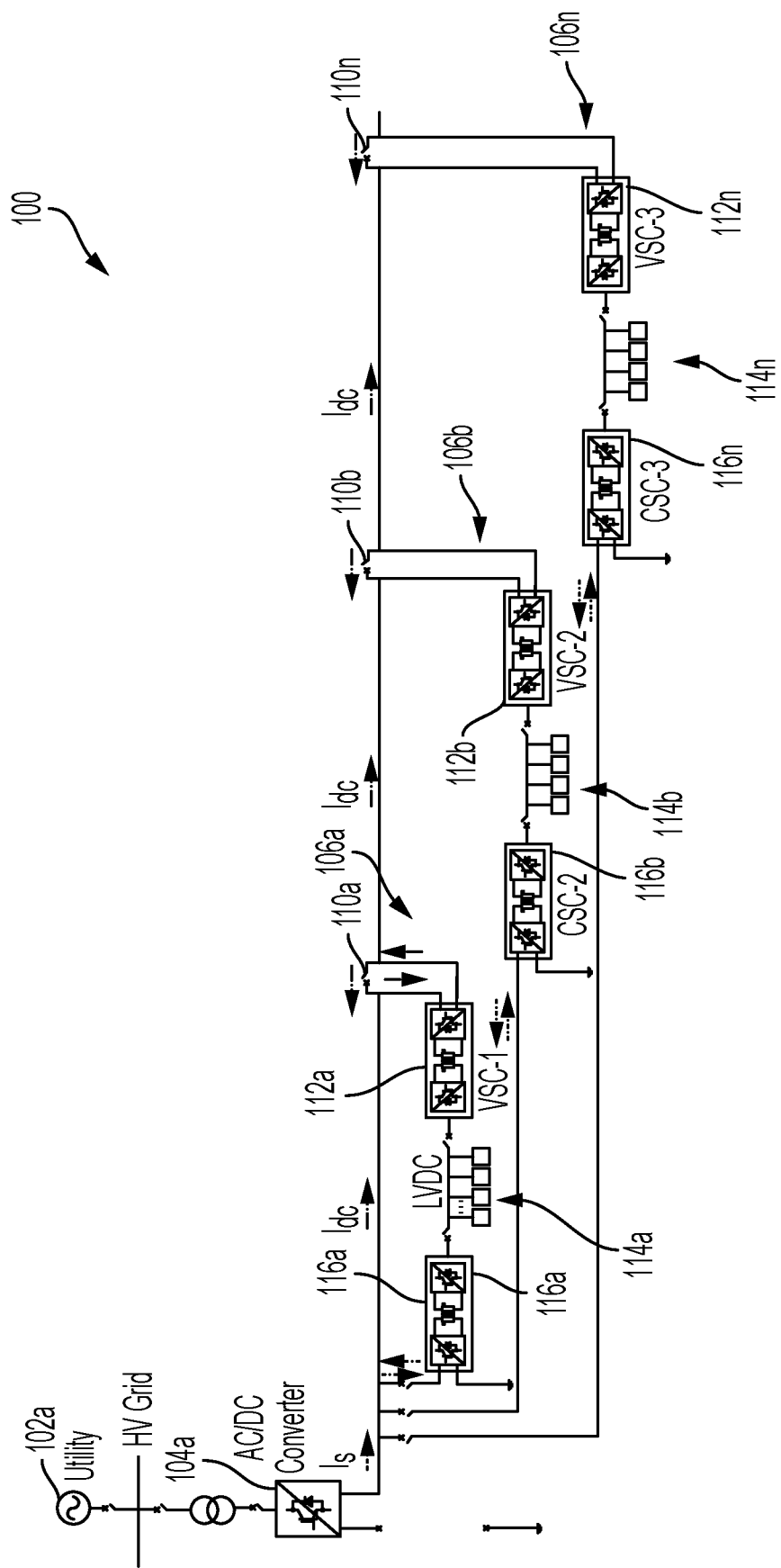
FIG. 5 illustrates a schematic diagram of a single-ended power system according to an example.

As discussed above, the secondary converters 116 may additionally or alternatively be controlled as current-source converters to provide supplemental current to the legs 106 as necessary. FIG. 5 illustrates a schematic diagram of the power system 100 according to an example in which the controller 120 controls the primary converters 112 to operate as voltage-source converters and the secondary converters 116 to operate as current-source converters. In the illustrated example, the power system 100 may be considered a single-ended system because the second AC-power source 102b is omitted. In addition, the optional AC/DC converters 104b, 108a, 108b are omitted.

In various examples, the controller 120 operates the primary converters 112 as voltage-source converters and operates the secondary converters 116 as current-source converters. The controller 120 operates the primary converters 112 as voltage-source converters to maintain a desired voltage at each of the legs 106. The first AC-power source 102a provides a current to the series-connected primary converters 112. Because the primary windings 304a, 304b, 304n are connected in series, the primary converters 112 receive the same current from the first AC-power source 102a. If current requirements differ between the legs 106, it may be advantageous to individually control the current to each of the legs 106.

In some examples, the controller 120 operates the converters 112 as current-source converters to provide a desired current to each of the legs 106. For example, if the current provided to the first primary converter 112a is lower than a desired current of the first loads 114a, the controller 120 may control the first secondary converter 116a to draw additional current from the first AC-power source 102a to supplement the current provided to the first primary converter 112a. The controller 120 may control the first secondary converter 116a to maintain a constant, desired current to the first loads 114a. In another example, if the current provided to the second primary converter 112b is higher than a desired current of the second loads 114b, the controller 120 may control the second secondary converter 116b to draw excess current from the second primary converter 112b, thereby bypassing the second loads 114b. The controller 120 may control the second secondary converter 116a to maintain a constant, desired current to the second loads 114a.

Figure 6:
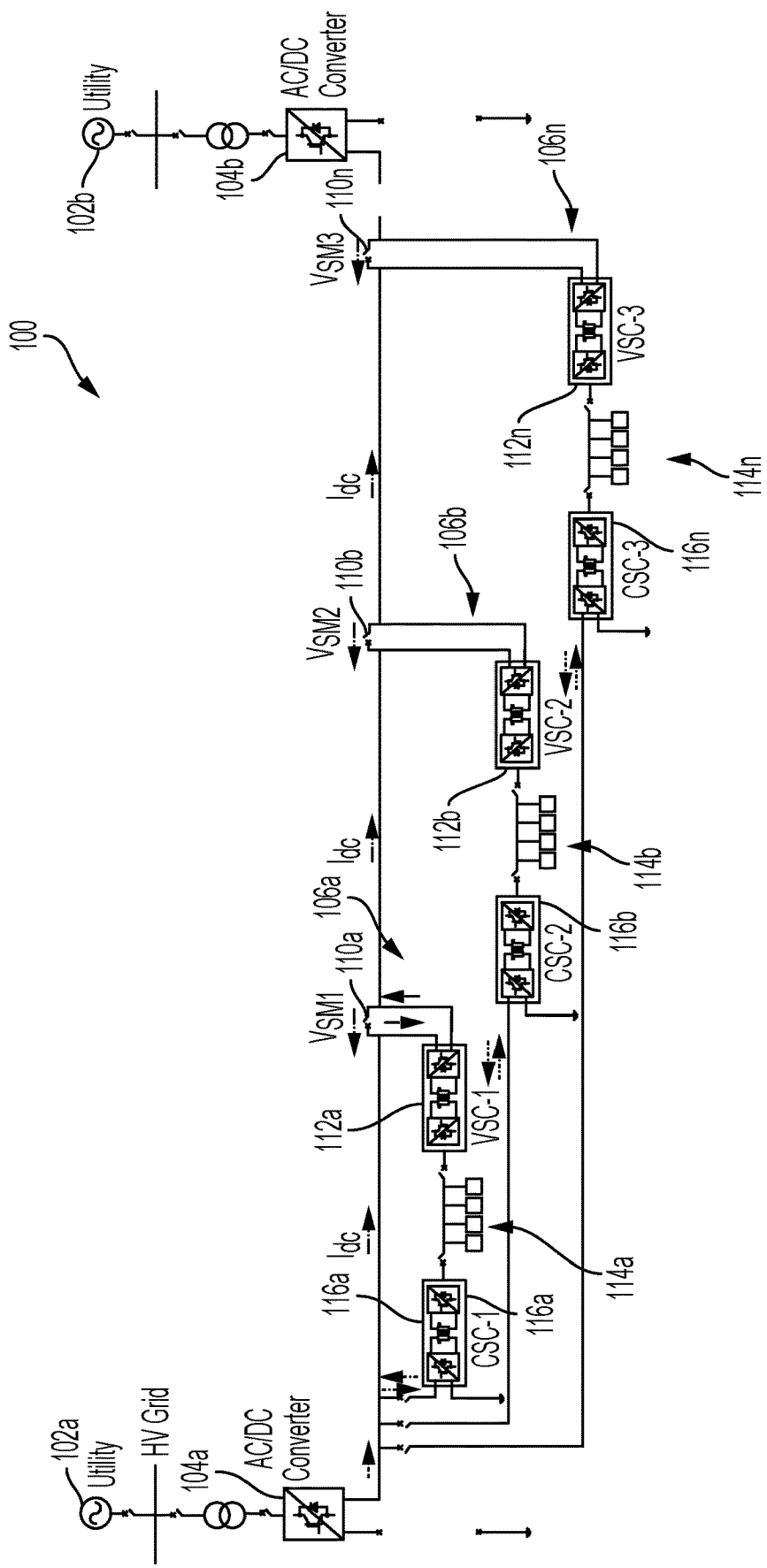
FIG. 6 illustrates a schematic diagram of a double-ended power system according to an example.

Accordingly, the controller 120 may control the primary converters 112 as voltage-source converters and the secondary converters 116 as current-source converters to provide a desired voltage and current to each of the loads 114. Although FIG. 5 illustrates a single-ended power system for purposes of example, in other examples, the same principles may apply to a double-ended power system. For example, FIG. 6 illustrates a schematic diagram of the power system 100 according to an example in which the controller 120 controls the primary converters 112 to operate as voltage-source converters and the secondary converters 116 to operate as current-source converters. In the illustrated example, the power system 100 may be considered a double-ended system because the second AC-power source 102b is included. For example, the second AC-power source 102b may provide a redundant power source in the event that the first AC-power source 102a becomes unavailable.

As discussed above with respect to act 210, the controller 120 may control the secondary converters 116 to balance a current between the legs 106 if current requirements between the legs 106 exceed a threshold deviation. In other examples, the controller 120 may be configured to control the secondary converters 116 to balance the current between the legs 106 regardless of how significantly or insignificantly imbalanced the current requirements are. However, a designer of the power system 100 may know in advance a degree to which the current requirements are likely to differ, and may decide whether or not to include the secondary converters 116 based on the expected deviation. For example, if the current requirements are likely to exceed the threshold deviation, the designer may choose to implement the secondary converters 116, and the controller 120 may balance the current using the secondary converters 116. Conversely, if the current requirements are unlikely to exceed the threshold deviation, the designer may choose to omit the secondary converters 116.

In examples discussed above, each of the primary converters 112a-112n and each of the secondary converters 116a-116n (for example, where the secondary converters 116a-116n are included) is coupled to a single respective one of the loads 114a-114n. For example, the first primary converter 112a and the first secondary converter 116a may be coupled to the first load 114a, the second primary converter 112b and the second secondary converter 116b may be coupled to the second load 114b, and so forth. In other examples, the loads 114a-114n may be coupled in parallel.

Figure 7:
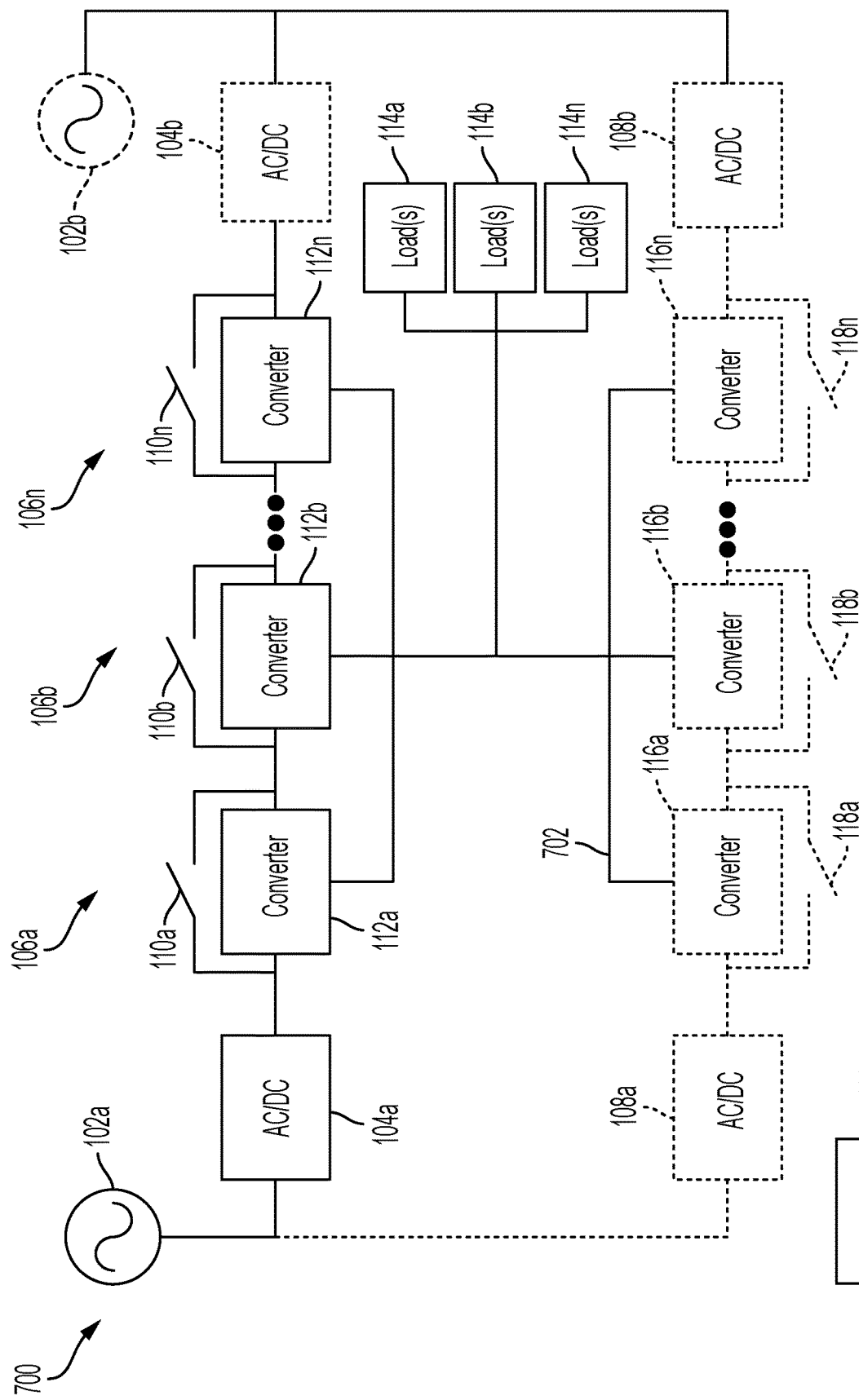
FIG. 7 illustrates a block diagram of a power system according to another example.

For example, FIG. 7 illustrates a block diagram of a power system 700 according to an example. The power system 700 is substantially similar to the power system 100 and includes the same components, which are labeled accordingly, in some examples. However, the components of the power system 700 may be arranged differently. For example, the outputs of the primary converters 112a-112n and the outputs of the secondary converters 116a-116n are coupled together at a common bus 702, which is in turn coupled to all of the loads 114a-114n, which are coupled in parallel. Accordingly, in this example, each of the converters 112a-112n, 116a-116n is coupled to each of the loads 114a-114n.

Figure 8:
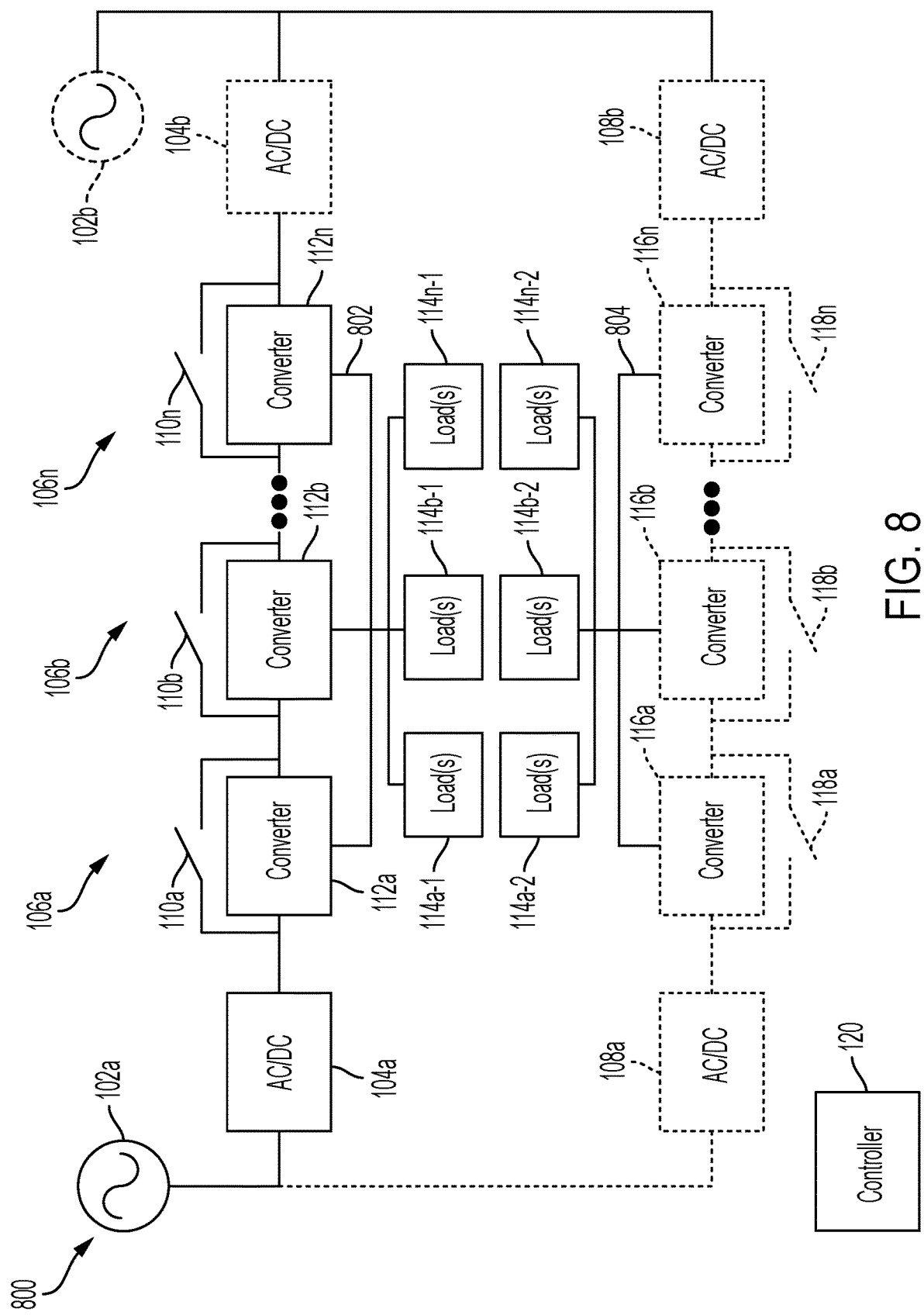
FIG. 8 illustrates a block diagram of a power system according to another example.

Similarly, FIG. 8 illustrates a block diagram of a power system 800 according to another example. The power system 800 is similar to the power system 100, and like components are labeled accordingly. The components of the power system 800 differ from those of the power system 100 in that, rather than the loads 114a-114n, the power system 800 includes a first group of loads 114a-1, 114b-1, 114n-1 ("first group of loads 114-1"), and a second group of loads 114a-2, 114b-2, 114n-2 ("second group of loads 114-2").

In addition, the connections of the power system 800 differ from those of the power system 100. The first group of loads 114-1 are coupled in parallel with one another. The second group of loads 114-2 are coupled in parallel with one another. The outputs of the primary converters 112a-112n are coupled together at a first common bus 802, which is in turn coupled to each load in the first group of loads 114-1. The outputs of the secondary converters 116a-116n are coupled together at a second common bus 804, which is in turn coupled to each load in the second group of loads 114-2. The power system 800 differs from the power system 700 at least in that, whereas in the power system 700 all of the loads 114a-114n are coupled to each of the converters 112a-112n, 116a-116n, in the power system 800 the primary converters 112a-112n are coupled to the first group of loads 114-1 but not the second group of loads 114-2, and the secondary converters 116a-116n are coupled to the second group of loads 114-2 but not the first group of loads 114-1.

The implementations of the power systems 700, 800 offer several advantages (which may, in some examples, also apply to other power-system configurations discussed above). For example, the power systems 700, 800 may offer convenient power scalability. If the power draw on the power systems 700, 800 increases, additional power converters may be easily added to scale up the power output of the power systems 700, 800. For example, in the power system 700, additional primary power converters may be coupled to the primary converters 112a-112n, and/or additional secondary power converters may be coupled to the secondary converters 116a-116n to increase the total amount of power that can be provided to the loads 114a-114n. Similarly, in the power system 800, additional primary power converters may be coupled to the primary converters 112a-112n to scale up the power output to the first group of loads 114-1, and/or additional secondary power converters may be coupled to the secondary converters 116a-116n to scale up the power output to the second group of loads 114-2.

An additional advantage of the power systems 700, 800 includes redundancy. For example, if any of the primary converters 112a-112n fails in the power system 700, a corresponding primary bypass switch 110a-110n may be closed to bypass the failed primary converter to discontinue providing power from the failed primary converter. Using the first primary converter 112a as an example, if the first primary converter 112a fails the first primary bypass switch 110a may be closed to bypass the first primary converter 112a. The first primary converter 112a may therefore stop providing power to the loads 114a-114n. However, the remaining primary converters 112b-112n remain coupled to the loads 114a-114n and may continue powering the loads 114a-114n. Thus, the power system 700 may be redundant inasmuch as even if a power converter fails, the loads to which the failed converter is connected may continue to receive power from the remaining power converters. In various examples, a number of converters 112, 116 (for example, a number of redundant converters 112, 116) may vary depending on a desired level of redundancy, an availability of power converters, a desired amount of space and/or power efficiency, and so forth.

Although the foregoing example is provided with respect to the first primary converter 112a, similar principles apply to the remaining primary converters 112b-112n and the secondary converters 116a-116n. Furthermore, although the foregoing example is provided with respect to the power system 700, similar principles apply to the power system 800. For example, any of the primary converters 112a-112n may be bypassed while the remaining primary converters 112a-112n continue to power the first group of loads 114-1, and any of the secondary converters 116a-116n may be bypassed while the remaining secondary converters 116a-116n continue to power the second group of loads 114-2.

In various examples, components may be added (or may be present but not explicitly illustrated) to various topologies discussed above. For example, in some implementations of the power systems 700, 800, additional DC/DC converters may be implemented between a common converter-output bus and respective loads. In the power system 700, for example, at least one additional DC/DC converter (not explicitly illustrated) may be coupled between the converters 112a-112n, 116a-116n and the loads 114a-114n. In the power system 800, for example, at least one first additional DC/DC converter (not explicitly illustrated) may be coupled between the primary converters 112a-112n and the first group of loads 114-1, and at least one second additional DC/DC converter (not explicitly illustrated) may be coupled between the secondary converters 116a-116n and the second group of loads 114-2. In some examples, an additional DC/DC converter may be implemented for each of the loads 114 in the power systems 700, 800. In various examples, the controller 120 may operate each additional DC/DC converter as a current-source converter to control an amount of current provided to each respective load. In other examples, one or more additional DC/DC converters may not be implemented.

Various controllers, such as the controller 120, may execute various operations discussed above. Using data stored in associated memory and/or storage, the controller 120 also executes one or more instructions stored on one or more non-transitory computer-readable media, which the controller 120 may include and/or be coupled to, that may result in manipulated data. In some examples, the controller 120 may include one or more processors or other types of controllers. In one example, the controller 120 is or includes at least one processor. In another example, the controller 120 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A power system comprising:
   a first plurality of converters configured to receive DC power, the first plurality of converters including a first plurality of primary windings and a first plurality of secondary windings, wherein
      each primary winding of the first plurality of primary windings is coupled in series, and
      each secondary winding of the first plurality of secondary windings is configured to be coupled to at least one first respective load; and
   a second plurality of converters coupled in parallel with the first plurality of converters and being configured to receive DC power, the second plurality of converters including a second plurality of primary windings and a second plurality of secondary windings, wherein
      each primary winding of the second plurality of primary windings is coupled in series, and
      each secondary winding of the second plurality of secondary windings is configured to be coupled to at least one second respective load.

2. The power system of claim 1, further comprising at least one AC/DC converter.

3. The power system of claim 2, wherein the at least one AC/DC converter is configured to provide the DC power to the first plurality of converters.

4. The power system of claim 1, further comprising a plurality of bypass switches, each bypass switch being coupled in parallel with a respective primary winding of the first plurality of primary windings.

5. The power system of claim 1, further comprising a common bus coupled to each secondary winding of the first plurality of secondary windings and to each load of the at least one first respective load.

6. The power system of claim 1, wherein the power system includes a plurality of legs, each leg including a primary converter of the first plurality of converters and a secondary converter of the second plurality of converters, each leg being configured to be coupled to a respective load.

7. The power system of claim 6, the plurality of legs including a first leg having a first secondary converter and a second leg having a second secondary converter, the power system further comprising at least one controller configured to control the first secondary converter to provide, via the second secondary converter, current from the first leg to the second leg.

8. The power system of claim 1, further comprising a first AC/DC converter and a second AC/DC converter, wherein the first plurality of converters is coupled in series between the first AC/DC converter and the second AC/DC converter.

9. The power system of claim 8, further comprising at least one controller, wherein the at least one controller is configured to control the first AC/DC converter to draw AC power from a first AC-power source and to control the second AC/DC converter to draw AC power from a second AC-power source.

10. The power system of claim 8, the power system further comprising a third AC/DC converter, and a fourth AC/DC converter, the second plurality of converters being coupled in series between the third AC/DC converter and the fourth AC/DC converter.

11. A method of operating a power system including a first plurality of converters having a first plurality of primary windings and a first plurality of secondary windings, and a second plurality of converters having a second plurality of primary windings and a second plurality of secondary windings, the method comprising:
   receiving, by a first primary winding of the first plurality of primary windings, a first primary current derived from first DC power received by the first plurality of coverters;
   providing, by the first primary winding of the first plurality of primary windings, the first primary current to a second primary winding of the first plurality of primary windings, the first plurality of primary windings being connected in series;
   providing, by each secondary winding of the first plurality of secondary windings, a first respective induced current to one or more first respective loads, each first induced current being induced by the first primary current, wherein the first respective induced current acts as a first respective DC power source to the one or more first respective loads;
   receiving, by a third primary winding of the second plurality of primary windings, a second primary current derived from second DC power received by the second plurality of converters;
   providing, by the third primary winding of the second plurality of primary windings, the second primary current to a fourth primary winding of the second plurality of primary windings, the second plurality of primary windings being connected in series; and providing, by each secondary winding of the second plurality of secondary windings, a second respective induced current to one or more second respective loads, each second induced current being induced by the second primary current, wherein the second respective induced current acts as a second respective DC power source to the one or more second respective loads.

12. The method of claim 11, wherein the power system further includes at least one AC/DC converter, the method further comprising:

receiving, by the at least one AC/DC converter, AC power; and providing, by the at least one AC/DC converter, the first primary current to the first primary winding, the first primary current being derived from the AC power.

13. The method of claim 11, wherein the power system further includes a plurality of bypass switches, each bypass switch of the plurality of bypass switches being coupled to a respective primary winding of the first plurality of primary windings, the method further comprising operating a first bypass switch of the plurality of bypass switches such that the first primary current bypasses the first primary winding of the first plurality of primary windings.

14. The method of claim 11, wherein the power system includes a plurality of legs having a first leg including a first secondary converter of the first plurality of converters and a second leg including a second secondary converter of the second plurality of converters, the method further comprising providing, by the first secondary converter via the second secondary converter, current from the first leg to the second leg.

15. The method of claim 11, wherein the power system includes a first AC/DC converter and a second AC/DC converter, the first plurality of converters being coupled in series between the first AC/DC converter and the second AC/DC converter, the method further comprising:

controlling the first AC/DC converter to draw AC power from a first AC-power source; and controlling the second AC/DC converter to draw AC power from a second AC-power source.

16. A non-transitory computer-readable medium storing thereon sequences of computer-executable instructions for operating a power system including a first AC/DC converter, a second AC/DC converter, a first plurality of converters having a first plurality of primary windings connected in series and a first plurality of secondary windings, and a second plurality of converters having a second plurality of primary windings connected in series and a second plurality of secondary windings, the sequences of computer-executable instructions including instructions that instruct at least one processor to:

control the first AC/DC converter to provide a first primary current to a first primary winding of a first converter of the first plurality of converters, the first primary current being derived from first DC power provided by the first AC/DC converter;

control the first converter to provide the first primary current to a second primary winding of the first plurality of primary windings;

control the first plurality of converters to cause each secondary winding of the first plurality of secondary windings to provide a first respective induced current to one or more first respective loads, each first induced current being induced by the first primary current, wherein the first respective induced current acts as a first respective DC power source to the one or more first respective loads;

control the second AC/DC converter to provide a second primary current to a third primary winding of a second converter of the second plurality of converters, the second primary current being derived from second DC power provided by the second AC/DC converter;

control the second converter to provide the second primary current to a fourth primary winding of the second plurality of primary windings; and control the second plurality of converters to cause each secondary winding of the second plurality of secondary windings to provide a second respective induced current to one or more second respective loads, each second induced current being induced by the second primary current, wherein the second respective induced current acts as a second respective DC power source to the one or more second respective loads.

17. The non-transitory computer-readable medium of claim 16, the instructions further instructing the at least one processor to control the first AC/DC converter to receive AC power and provide the first primary current to the first primary winding, the first primary current being derived from the AC power.

18. The non-transitory computer-readable medium of claim 16, wherein the second plurality of converters includes the second converter and a third converter, and wherein the power system includes a plurality of legs having a first leg including the second converter and a second leg including the third converter, the instructions further instructing the at least one processor to control the second converter to provide, via the third converter, current from the first leg to the second leg.

19. The non-transitory computer-readable medium of claim 16, wherein the power system includes a third AC/DC converter, the first plurality of converters being coupled in series between the first AC/DC converter and the third AC/DC converter, the instructions further instructing the at least one processor to:

control the first AC/DC converter to draw AC power from a first AC-power source; and control the third AC/DC converter to draw AC power from a second AC-power source.

20. The power system of claim 1, wherein the at least one first respective load includes a first set of one or more loads and the at least one second respective load includes the first set of the one or more loads.

* * * * *